Dec. 25, 1956  H. M. OLSON  2,775,495
SPACER FOR PISTON RINGS
Filed Nov 1, 1954
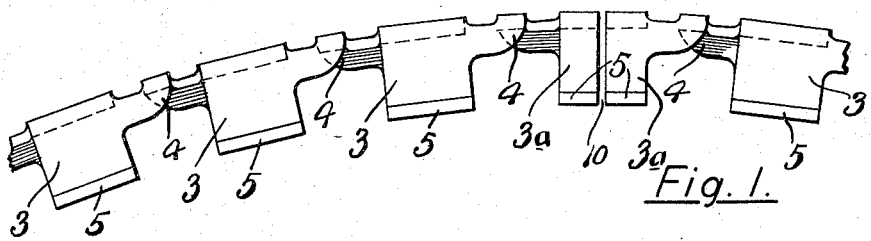
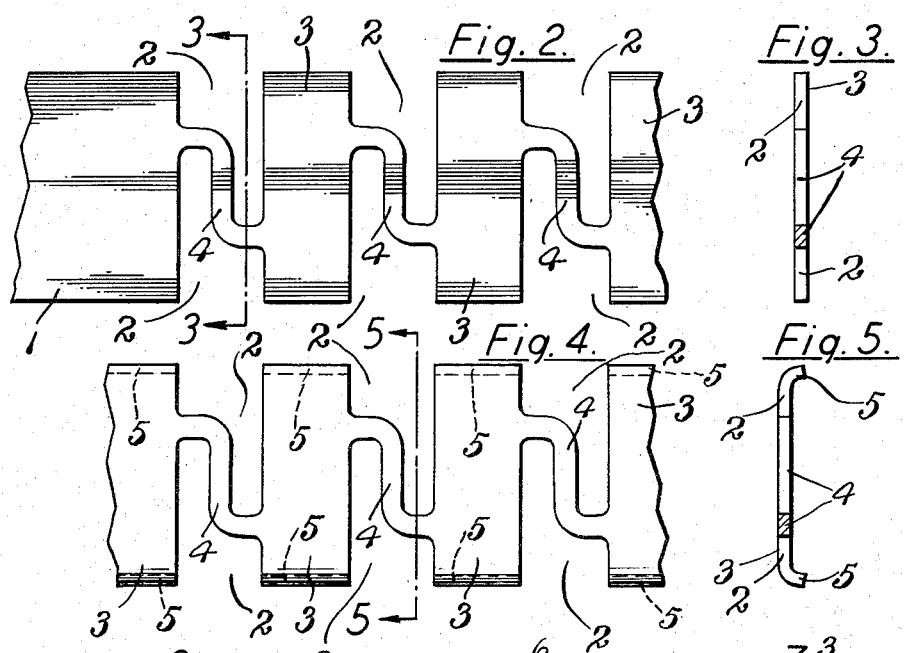
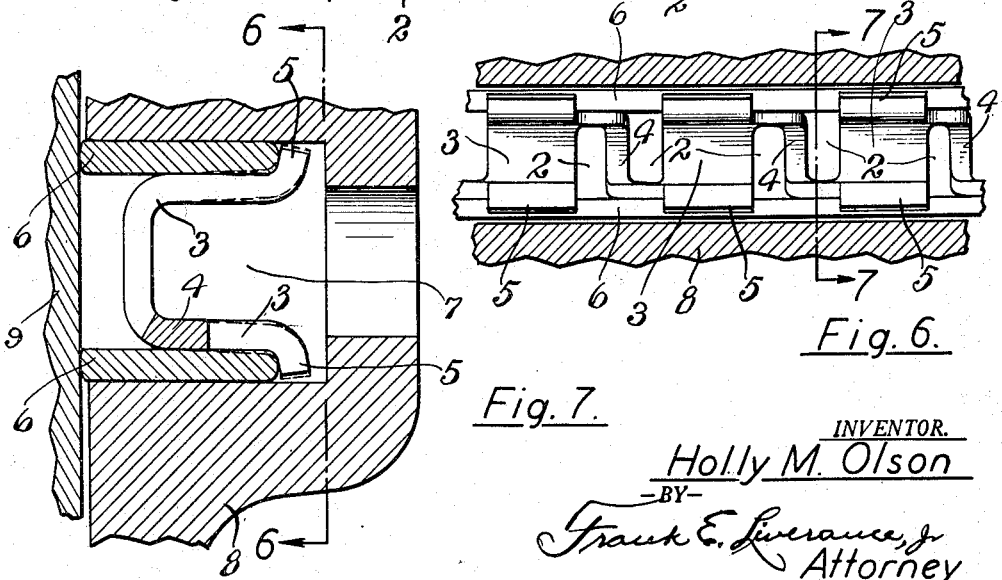
INVENTOR.
Holly M. Olson
BY
Frank E. Liverance, Jr.
Attorney

United States Patent Office 2,775,495
Patented Dec. 25, 1956

2,775,495

SPACER FOR PISTON RINGS

Holly M. Olson, Muskegon, Mich., assignor to Sealed Power Corporation, Muskegon, Mich., a corporation of Michigan Application November 1, 1954, Serial No. 466,057

1 Claim. (Cl. 309—44)

This invention relates to a rail spacer, carrier or support and expander for supporting thin rails and pressing them with yielding engagement against a cylinder wall, the complete piston ring with which my invention is used including such unit expander, spacer and support and two rails one at each side thereof which rails are against opposed upper and lower sides of a piston ring groove in a piston.

An object of the invention is to provide a structure which comprises such novel expander and spacer member, exerting a continuous yielding expanding force on the rail members at a large number of closely spaced points, thus the rails bear against the cylinder wall uniformly throughout their circumferences. Such expander, spacer and support is circumferentially compressible to generate an expanding force within itself, and is therefore not dependent upon pressing against the bottom of a piston ring groove. Piston ring grooves are of varying depths. With my invention the depths of the grooves are of no importance as the ring assembly functions independently and irrespective of the ring groove depth.

A further object is to provide ledge means engaging against the inner edges of the rails used, located at an angle to the axial width dimension of the piston ring groove thereby providing components of the expanding force to push the rails in the direction of the width of the piston ring groove. The rails more perfectly seal against the opposed sides of the groove. Such ledges also transmit force from the expander in an outward direction to press the rails at their outer curved edges against the cylinder wall with uniform pressure. My invention is also simple in assembly and the structure embodying it is of a type readily adapted to be used with automatic loading devices in assembling the piston rings with the cylinders in which they are used. Furthermore, the rails readily slide upon the supporting portions of the expander and spacer with which they engage so that there is the quick responsiveness which is necessary for effective performance. The rails are independently movable, engaging the cylinder wall at spaced distances, and the expanding supporting and spacing member has ample venting passages therethrough for the passage of excess oil collected by the rails, there being free unobstructed oil flow to inside the piston.

An understanding of the invention and a preferred embodiment thereof may be had from the following description taken in connection with the accompanying drawing, in which, Fig. 1 is a fragmentary plan view of the expander, spacer and rail support, the fragmentary portion shown being at the parting therein.

Fig. 2 is an enlarged plan view showing the first steps of operation of forming the ring from a continuous uniform width of thin, metallic, ribbon stock.

Fig. 3 is a transverse section substantially on the plane of line 3—3 of Fig. 2.

Figs. 4 and 5 show in elevation, and in transverse section on the plane of line 5—5 of Fig. 4, respectively, a second step in operation, the edges of the separated rectangular segments being formed in lips extending to the same side of the blank of sheet metal from which the device is made.

Fig. 6 is an inner elevation of a fragmentary portion of the expander, rail support and spacer of my invention, the plane of the section being that shown by the line 6—6 of Fig. 7, and Fig. 7 is an enlarged vertical section at right angles to that shown in Fig. 6, substantially on the plane of line 7—7 of Fig. 6.

Like reference characters refer to like parts in the different figures of the drawing, and all of the sections are taken looking in the directions indicated by the arrows associated with the section lines.

In making the rail support, spacer and expander, a continuous length of thin metal in ribbon form, indicated at 1, having a predetermined uniform width, is stamped and cut at closely spaced intervals inwardly to make recesses or slots 2 of greatest width at their outer ends and narrowing at their inner portions, thereby providing spaced rectangular sections which are connected by integral tie members 4. Such tie members of the shape shown have central parallel sections and oppositely extending end sections, the end sections being integrally connected to the adjacent edges of the adjacent rectangular portions 3.

A succeeding step is to bend from each outer edge of each of the rectangular sections 3 a lip or ledge 5, both ledges being bent in the same direction and at an angle less than a right angle to the plane of said sections 3 as shown in Fig. 5.

The rail spacer support and expander is completed by shaping the tie connected rectangular sections 3, with the lips or ledges 5 integral therewith, into channel form. Each of the sections 3 is bent into U-shape, best shown in Fig. 6, having upper and lower spaced legs and a vertical web and tied together by the ties 4. The central portions of the ties remain substantially the same but at their upper ends are bent in the same direction so that the lateral extensions to the central portions of the ties 4 are located in substantially the same planes as the upper and lower legs of the U-shaped members formed from the rectangular sections 3.

The device thus provided is of a predetermined length for the piston and piston ring groove and rails with which it is to be associated. It is shaped into circular form having the ends coming together. In assembling to complete the piston ring an upper and a lower thin metal rail 6 are located with the inner edges thereof against the upwardly and downwardly turned lips or ledges 5 (Fig. 7), the outer sides of which are at an angle greater than the right angle of the planes of the upper and lower legs of the U-formed sections 3. Such piston ring is adapted to be installed in a piston ring groove 7 in a piston 8, the outer edges of the rails 6 extending beyond the adjacent curved surfaces of the piston 8 to bear against the inner walls of a cylinder 9 (Fig. 7). At the abutting ends of the rail support, spacer and expander the sections 3 are of lesser width, as indicated at 3a in Fig. 1, coming together at the parting or gap 10 as shown in Fig. 1.

In the installation upon and after the closing of the gap at 10 in the rail support, spacer and expander a circumferential compression takes place, the ends at the parting 10 being forced against each other and the ties 4 strained, the spacer and expander being circumferentially contracted in circumference. This causes an outwardly pressing force against the inner edges of the rails 6 so that at their outer edges they bear against a cylinder wall 9 with desired unit pressure. It is evident also that by reason of the angle of the surfaces of the lips or ledges 5 which engage against the inner edges of the rails 6, the opposed upper and lower sides or legs of the U-shaped sections are sprung or strained out of form and there is, in addition to an outer horizontal force in the structure shown in Fig. 7, a component causing the upper ring 6 to move into snug sealing engagement against the upper side of the ring groove 7 and the lower rail 6 to move with the same sealing engagement against the lower side of the groove. The rails of thin sheet metal, usually steel, are also parted so that they may be passed over the head of a piston to the groove in which located. When installed as in Fig. 7 such rails are substantially though not completely closed at their partings.

The structure described is readily fabricated. Its installation with the rails in a piston ring groove is simply performed using regular and accepted automatic devices in such operations. Economy in manufacturing and in use is also attained.

The invention is defined in the appended claim and is to be considered comprehensive of all forms of structure coming within its scope.

I claim:

A parted, circular, piston ring rail spacer, support and expander comprising, a plurality of spaced U-shaped sections having upper and lower legs and vertical webs connecting said legs, said legs terminating at their free ends in upwardly and downwardly extending ledges, respectively, and resilient ties between adjacent U-sections each tie having a middle portion spaced from, between and in the same plane as the two next adjacent webs, and oppositely extending lateral end portions at right angles to said middle portions integrally joined with said two next adjacent U-sections.

References Cited in the file of this patent

UNITED STATES PATENTS

| | | |
|---|---|---|
| 2,220,947 | Paton | Nov. 12, 1940 |
| 2,303,798 | Solenberger | Dec. 1, 1942 |
| 2,602,715 | Shirk | July 8, 1952 |
| 2,635,022 | Shirk | Apr. 14, 1953 |
| 2,686,093 | Shirk | Aug. 10, 1954 |
| 2,695,825 | Estey | Nov. 30, 1954 |